United States Patent [19]
Reiss et al.

[11] Patent Number: 5,787,143
[45] Date of Patent: Jul. 28, 1998

[54] NUCLEAR REACTOR FUEL ASSEMBLY

[75] Inventors: Thomas Reiss, Röttenbach; Kurt Kraus, Höchstadt, both of Germany

[73] Assignee: Siemens Aktiengesellschaft, Munich, Germany

[21] Appl. No.: 786,845

[22] Filed: Jan. 22, 1997

Related U.S. Application Data

[63] Continuation of PCT/DE95/00898 filed on Jul. 10, 1995.

[30] Foreign Application Priority Data

Jul. 22, 1994 [DE] Germany ............... 44 26 136.5

[51] Int. Cl.$^6$ ................................. G21K 3/12
[52] U.S. Cl. ............................. 376/446; 376/448
[58] Field of Search ................... 376/446, 448, 376/440

[56] References Cited

U.S. PATENT DOCUMENTS

| | | | |
|---|---|---|---|
| 3,607,639 | 9/1971 | Santen et al. | 376/446 |
| 3,968,008 | 7/1976 | Piepers et al. | 376/446 |
| 4,304,635 | 12/1981 | Lippert et al. | 376/448 |
| 4,448,744 | 5/1984 | Karger et al. | 376/448 |
| 4,526,744 | 7/1985 | Borrman et al. | 376/440 |
| 4,663,118 | 5/1987 | Nelson | 376/446 |
| 4,671,926 | 6/1987 | Broberg et al. | 376/446 |
| 4,707,328 | 11/1987 | Arbink et al. | 376/446 |
| 4,792,429 | 12/1988 | Hatfield | 376/446 |
| 4,861,545 | 8/1989 | Lippert et al. | 376/448 |
| 4,895,697 | 1/1990 | Andersson et al. | 376/446 |
| 5,339,342 | 8/1994 | Meier et al. | 376/446 |
| 5,436,946 | 7/1995 | Curulla et al. | 376/448 |

FOREIGN PATENT DOCUMENTS

| | | | |
|---|---|---|---|
| 0 142 778 A3 | 5/1985 | European Pat. Off. | |
| 0 182 196 A1 | 5/1986 | European Pat. Off. | |
| 0 550 868 A1 | 7/1993 | European Pat. Off. | |
| 28 24 265 | 12/1979 | Germany | |
| 30 27 562 A1 | 2/1982 | Germany | |
| 3200092 | 8/1988 | Japan | 376/448 |
| 94/00848 | 1/1994 | WIPO | |

*Primary Examiner*—Harvey E. Behrend
*Attorney, Agent, or Firm*—Herbert L. Lerner; Laurence A. Greenberg

[57] ABSTRACT

A nuclear reactor fuel assembly has an elongate fuel assembly casing. A fuel assembly head which is located within an open end of this fuel assembly casing is connected through the use of a rigid connecting body to a fuel assembly foot located in the fuel assembly casing and can be lifted off out of the fuel assembly casing. An angled part bears on the outside against two sides of the fuel assembly casing which meet one another and is retained on the fuel assembly head through the use of a bolt. A rigid peg can be disposed on the angled part and can engage into a port in one of the two sides which meet one another. Such a rigid peg can also be disposed on one of the two sides of the fuel assembly casing and can engage into a pocket in the angled part.

8 Claims, 6 Drawing Sheets

NUCLEAR REACTOR FUEL ASSEMBLY

CROSS-REFERENCE TO RELATED APPLICATION

This application is a Continuation of International Application Ser. No. PCT/DE95/00898, filed Jul. 10, 1995.

BACKGROUND OF THE INVENTION

Field of the Invention

The invention relates to a nuclear reactor fuel assembly with an elongate fuel assembly casing in which a fuel assembly head is located at one open end and a fuel assembly foot is located at another open end, a rigid connecting body connects the fuel assembly foot to the fuel assembly head, fuel rods containing nuclear fuel are disposed between the fuel assembly head and the fuel assembly foot, an angled part is adapted to the fuel assembly casing, has two legs and bears on the outside against two sides of the fuel assembly casing that meet one another, and a bolt is located at the vertex of the two legs and retains the angled part on the fuel assembly head.

Such a nuclear reactor fuel assembly is known from Published European Patent Application 0 142 778 A3, corresponding to U.S. Pat. No. 4,861,545. The rigid connecting body between the fuel assembly foot and the fuel assembly head of that nuclear reactor fuel assembly is a fuel rod which is filled with nuclear fuel and is firmly screwed at one end to the fuel assembly head and at the other end to the fuel assembly foot. A corner bolt is located on the top side of the fuel assembly head in one corner of the fuel assembly casing and has a longitudinal axis parallel to the longitudinal direction of the fuel assembly casing and to the longitudinal axes of the fuel rods. A transverse web, which is located in one corner of the fuel assembly casing on the inside, rests on the top end of the corner bolt. The angled part rests on top of the transverse web, with a vertex web located at the vertex of the angled part. The angled part is firmly screwed to the corner bolt on the fuel assembly head through the use of a screw bolt which is parallel to the longitudinal direction of the fuel assembly casing and to the longitudinal axes of the fuel assemblies and which passes through the vertex web of the angled part and the transverse web.

SUMMARY OF THE INVENTION

It is accordingly an object of the invention to provide a nuclear reactor fuel assembly, which overcomes the hereinafore-mentioned disadvantages of the heretofore-known devices of this general type and which makes it possible to lift off a fuel assembly head out of a fuel assembly casing, without the fuel assembly casing having to be drawn off previously from the fuel rods of the nuclear reactor fuel assembly. With the foregoing and other objects in view there is provided, in accordance with the invention, a nuclear reactor fuel assembly, comprising an elongate fuel assembly casing having two open ends and having sides; a fuel assembly head disposed at one of the open ends; a fuel assembly foot disposed at the other of the open ends; a rigid connecting body connected between the fuel assembly head and the fuel assembly foot; fuel rods disposed between the fuel assembly head and the fuel assembly foot, the fuel rods containing nuclear fuel; an angled part adapted to the fuel assembly casing and having two legs with a vertex, the angled part bearing from the outside against two of the sides of the fuel assembly casing meeting one another; a bolt disposed at the vertex of the two legs for retaining the angled part on the fuel assembly head; and a peg disposed rigidly on the angled part and engaging into a port formed in a side of the fuel assembly casing and/or a peg disposed rigidly on a side of the fuel assembly casing and engaging into a pocket formed in the angled part, at least at one of the two sides of the fuel assembly casing.

It is thereby possible to avoid the use of a transverse web which is disposed on the inside in the corner of the fuel assembly casing and prevents the fuel assembly head from being drawn out of the fuel assembly casing. Furthermore, the fuel assembly casing can be fastened to the fuel assembly foot, without the accessibility of the fuel rods being impaired.

The fuel assembly foot is then retained on the fuel assembly head not only by the rigid connecting body, whether it is a fuel rod filled with nuclear fuel or a pipe of any cross section for carrying nonboiling water in a nuclear reactor, but additionally by the fuel assembly casing as well. In other words, a redundant retention of the fuel assembly foot on the fuel assembly head can be achieved.

The fuel assembly foot can also be loosely supported on the fuel assembly casing on the inside. It is then even possible to draw the fuel assembly head and fuel assembly foot out of the casing, together with the fuel rods. A redundant retention of the fuel assembly foot on the fuel assembly head when the nuclear reactor fuel assembly is fully assembled is nevertheless provided.

In accordance with another feature of the invention, there is provided a return spring exerting a force in a given direction, the bolt being a locking bolt attached to the fuel assembly head for countersinking into the fuel assembly head in longitudinal direction of the fuel assembly casing counter to the given direction and engaging into a continuous bore in the angled part for displacement in longitudinal direction of the fuel assembly casing.

In accordance with a further feature of the invention, the angled part has a bearing body bearing from the inside against a side of the fuel assembly casing opposite the side of the fuel assembly casing at which the peg is disposed.

In accordance with an added feature of the invention, there is provided a bushing in the side of the fuel assembly casing opposite the side of the fuel assembly casing at which the peg is disposed, the bearing body covering the bushing.

In accordance with an additional feature of the invention, the peg on the angled part engaging in the side of the fuel assembly casing also engages behind the fuel assembly head.

In accordance with a concomitant feature of the invention, the peg engages in a pocket formed in the fuel assembly head.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
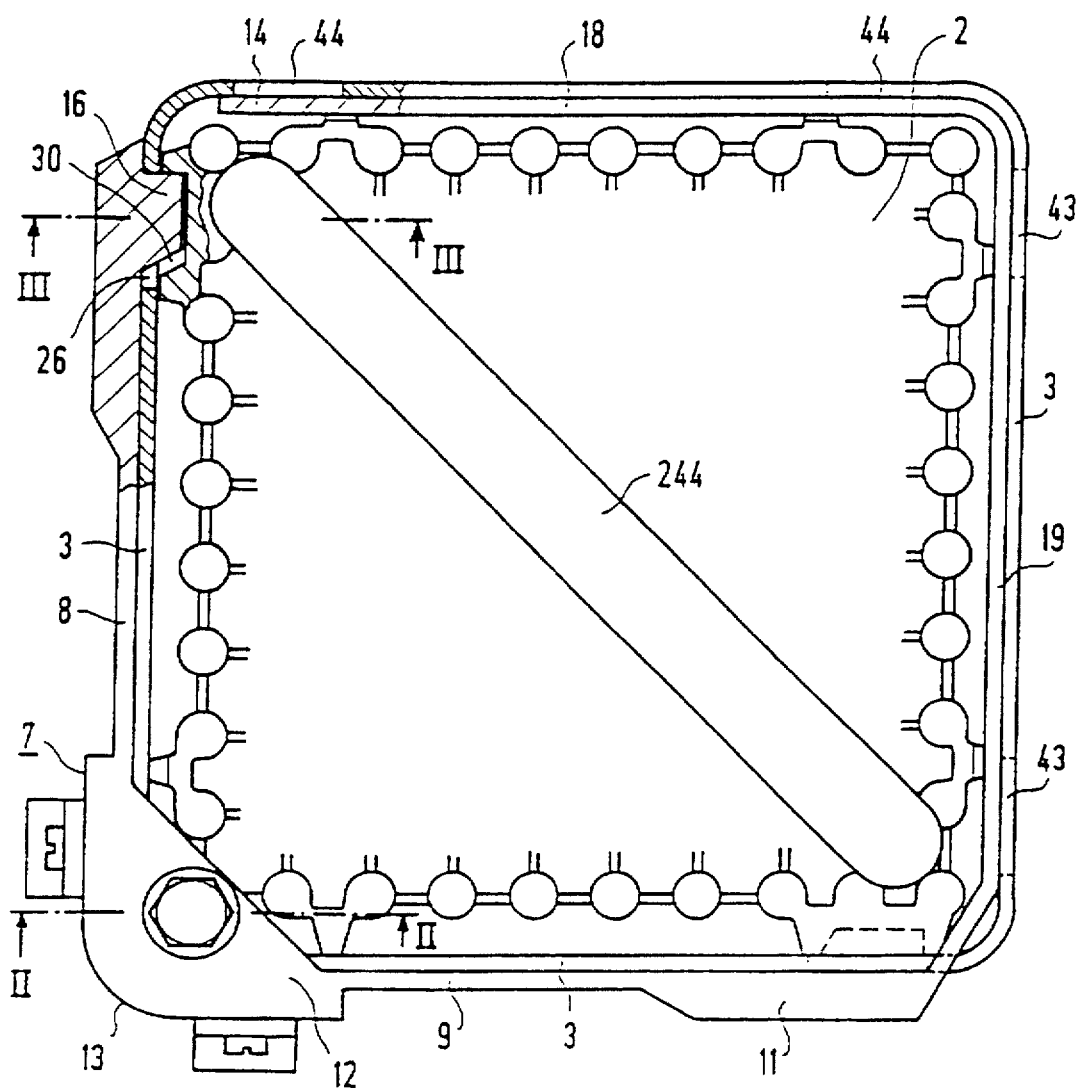
FIG. 1 is a diagrammatic, partly sectional, top-plan view of an upper end of a nuclear reactor fuel assembly according to the invention.
Figure 2:
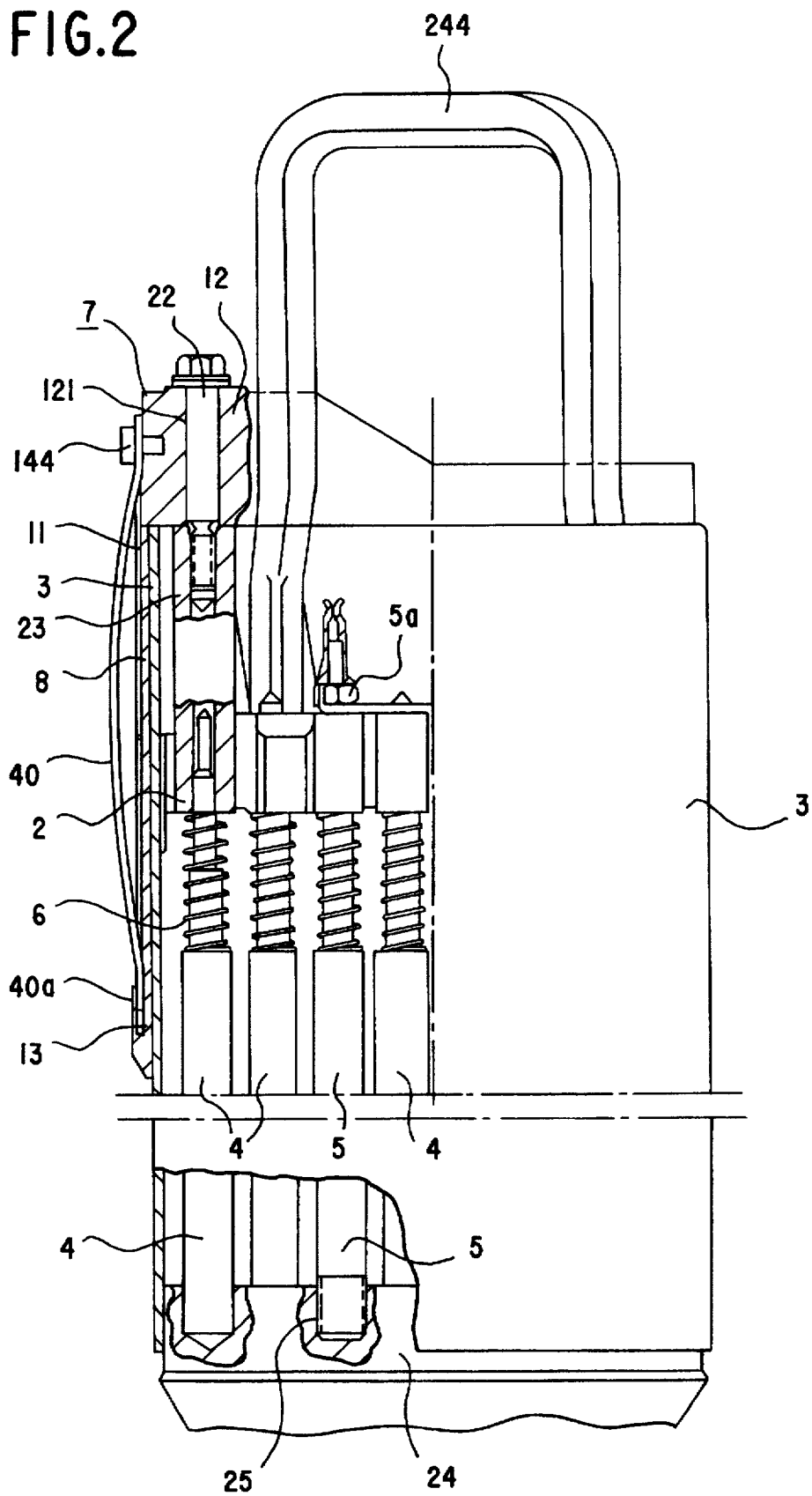
FIG. 2 is a longitudinal-sectional view of the nuclear reactor fuel assembly, which is taken along a dot-dash line II—II of FIG. 1, in the direction of the arrows.

Referring now in detail to FIGS. 1 to 6 of the drawings as a whole, there is seen a nuclear reactor fuel assembly which is intended for a boiling water nuclear reactor and has a fuel assembly head 2, an elongate fuel assembly casing 3 of square cross section and a fuel assembly foot 24. The fuel assembly head 2 is located at an upper end of the fuel assembly casing 3. The fuel assembly foot 24 is located at and within a lower end of the fuel assembly casing 3 and can be fastened or loosely supported at the lower end of the fuel assembly casing 3. A top side of the fuel assembly head 2 is provided with a holding handle 244 which projects from an open upper end of the fuel assembly casing 3.

Fuel rods 4 and 5 which are located within the fuel assembly casing 3 between the fuel assembly head 2 and fuel assembly foot 24 and are filled with nuclear fuel, are parallel to the longitudinal direction of the elongate fuel assembly casing 3. These fuel rods 4 and 5 are disposed next to one another. Upper ends of these fuel rods 4 and 5 engage loosely into bores in the fuel assembly head 2, and all of the fuel rods 4 and 5 are supported at the upper ends against the fuel assembly head 2 through the use of helical springs 6. Lower ends of the fuel rods 4 and 5 are likewise guided within the fuel assembly casing 3 in bushings in the fuel assembly foot 24.

Some fuel rods 5 act as rigid connecting bodies which pass through the fuel assembly head 2 and are firmly screwed to the fuel assembly head 2 through the use of a nut 5a. Each of these fuel rods 5 have another end screwed into bores 25 assigned to them in the fuel assembly foot 24.

Figure 4:
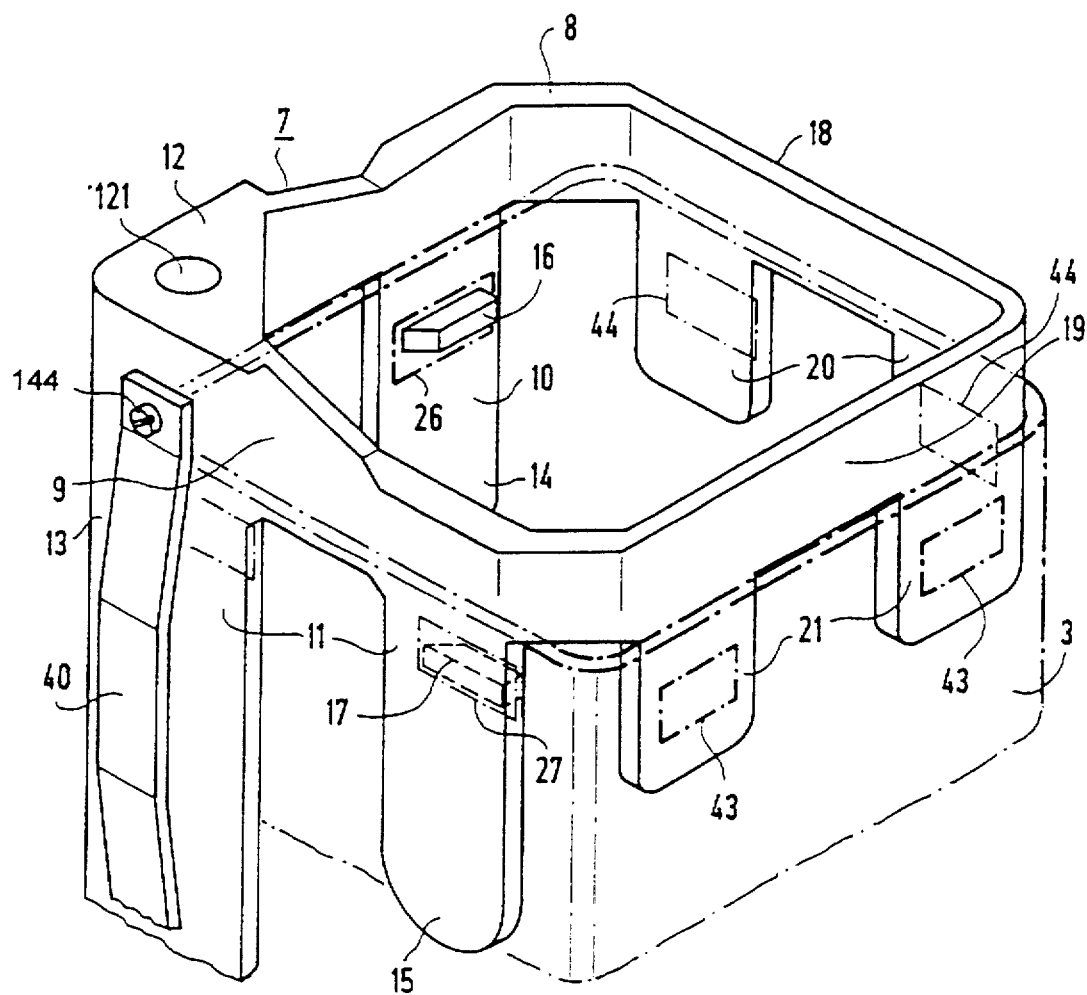
FIG. 4 is a fragmentary, perspective view of an angled part of the nuclear reactor fuel assembly according to FIGS. 1 to 3.

As is shown particularly in FIG. 4, an angled part 7 has two legs 8 and 9 that are disposed at right angles to one another and are of equal length. Walls 10 and 11 which are located on lower edges of these legs 8 and 9 are at right angles to a vertex web 12 at a vertex of the legs 8 and 9 and therefore of the angled part 7. The walls 10 and 11 form an elongate L-shaped profile 13 at right angles to the legs 8 and 9 on the vertex web 12. The walls are each shaped out to form a rigid bearing tongue 14 and 15 at the ends of the legs 8 and 9.

Rigid pegs 16 and 17 which are rigidly attached to respective inner surfaces of each of the rigid bearing tongues 14 and 15, extend transversely relative to the longitudinal direction of the bearing tongues 14 or 15 and cannot be moved on the angled part 7 either in the longitudinal direction or transversely relative to the longitudinal direction. An angled part which is constructed at the ends of the two legs 8 and 9 and has additional legs 18 and 19 disposed at right angles to one another, completes the legs 8 and 9 to form a frame having a square inner and outer cross section.

Flat bearing bodies 20 and 21 are constructed on a lower edge of these additional legs 18 and 19.

An elongate leaf spring 40 which extends in the direction of the L-shaped profile 13 is disposed on each of the two walls 10 and 11 on the outside of the L-shaped profile 13 and in each case is rigidly fastened at one end to the angled part 7 through the use of a screw 144. Another end of each leaf spring 40 is guided so as to slide freely in a slot 40a on the outside of the L-shaped profile 13 at the lower end of the latter. Each leaf spring 40 is bent along transverse lines in such a way that these leaf springs 40 arch outward away from the outside of the L-shaped profile 13.

Furthermore, a continuous bore 121 which is formed at right angles to the two legs 8 and 9, that is to say parallel to the walls 10 and 11, and is intended for a screw bolt 22, is located in the vertex web 12 at the vertex of the legs 8 and 9.

Figure 3:
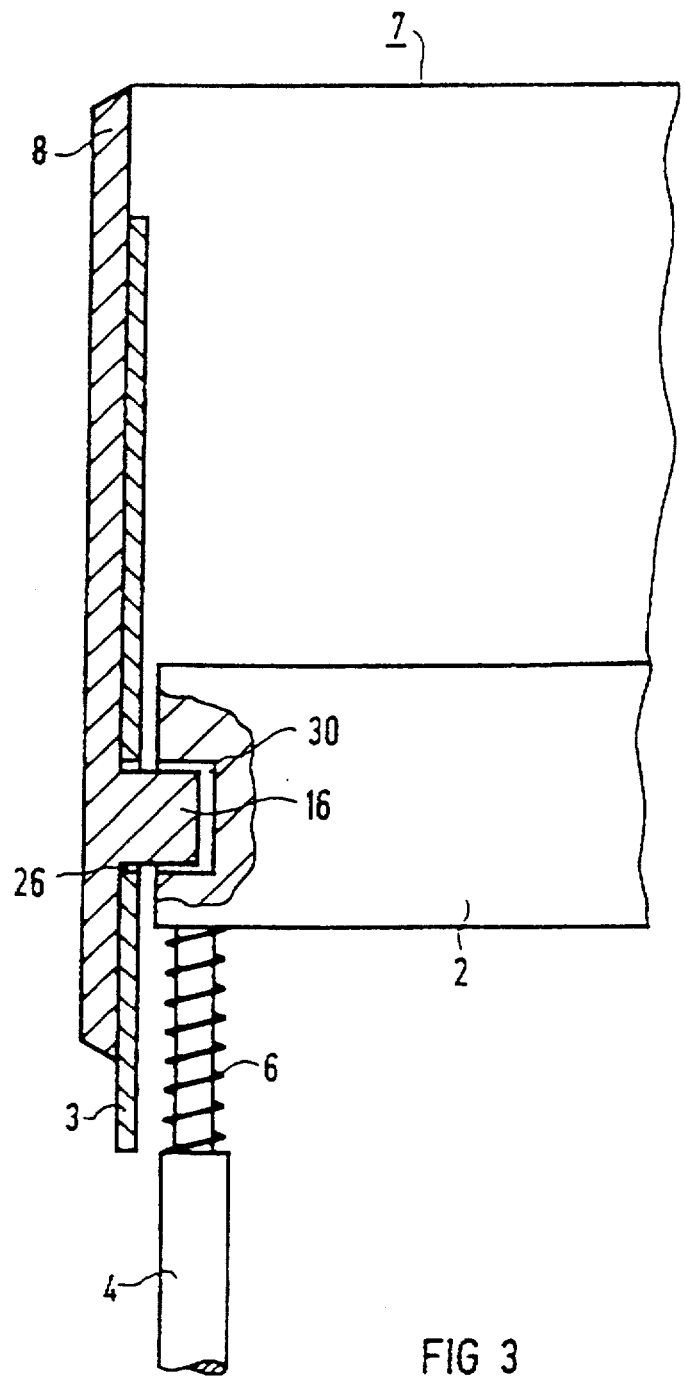
FIG. 3 is a fragmentary, longitudinal-sectional view of the nuclear reactor fuel assembly, which is taken along a dot-dash line III—III of FIG. 1, in the direction of the arrows.

The angled part 7 is firmly screwed to a stay bolt 23 on the top side of the fuel assembly head 2 through the use of the screw bolt 22. The angled part 7 is adapted to the fuel assembly casing 3 in such a way that the walls 10 and 11 of the angled part 7 in each case lie flat against the outside of one of the two sides of the fuel assembly casing 3 which meet one another, and the rigid pegs 16 and 17 each engage into an opening in the form of a port 26 and 27 in a surface of one of these two sides of the fuel assembly casing 3 and into an opening in the from of a pocket 30 which is located laterally in the surface of the fuel assembly head 2 under the port 26 or 27 as is seen in FIG. 3. The load is taken up through the rigid pegs 16 and 17 in the respective pocket in the fuel assembly head 2, so that the screw bolt 22 can be nonloaded.

Figure 5:
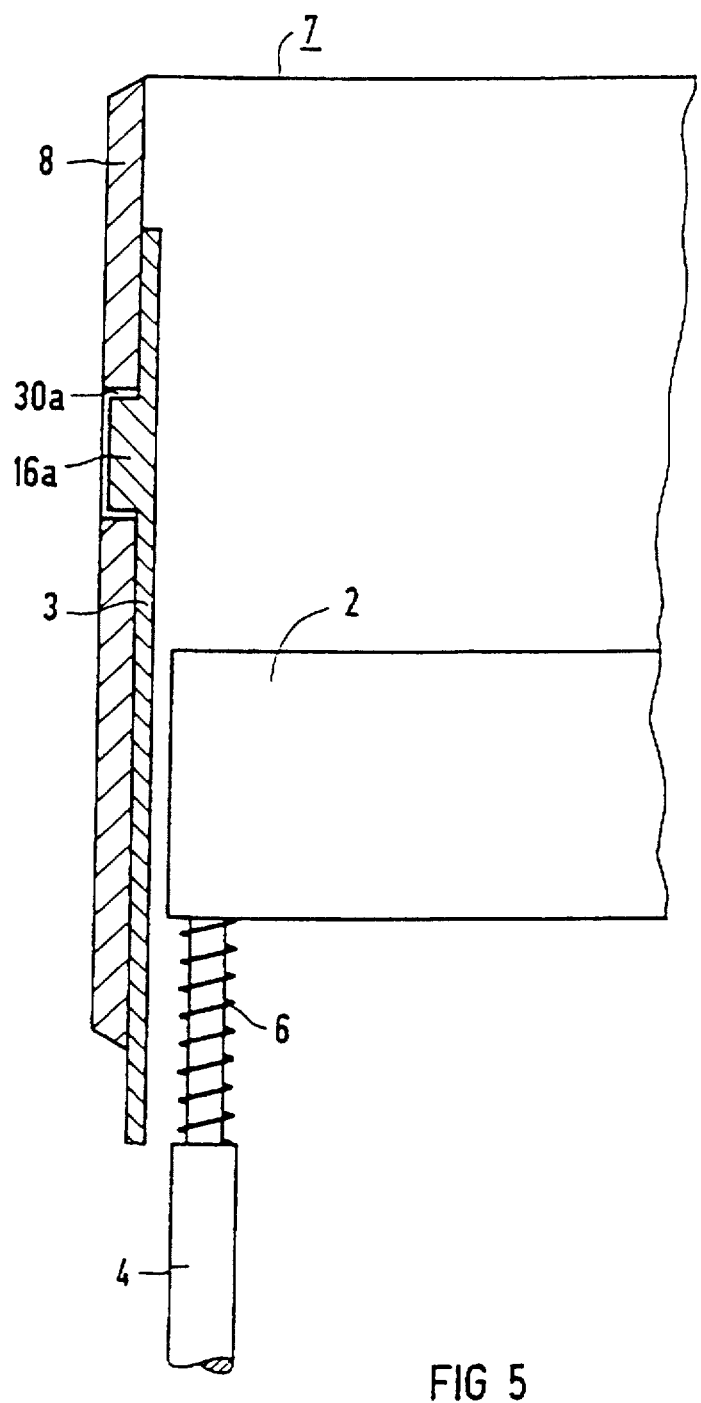
FIG. 5 is a view similar to FIG. 3 of another embodiment of the nuclear reactor fuel assembly.

As is indicated in FIG. 5, a rigid peg 16a can also be rigidly attached to one side of the fuel assembly casing 3 on the outside and can engage into a pocket 30a in the angled part 7.

The flat bearing bodies 20 and 21 on the additional legs 18 and 19 of the angled part 7 engage into the fuel assembly casing 3 and each bear there, on the inside, against one of two opposite sides of the fuel assembly casing 3 located opposite those sides of the fuel assembly casing 3 into which the rigid pegs 16 and 17 engage. It is thereby possible to cover ports 43 and 44 which are provided in the two opposite sides of the fuel assembly casing 3 for the possible reception of rigid pegs of an angled part.

After the fuel assembly head 2 has been inserted into the upper end of the elongate fuel assembly casing 3, the angled part 7 is first placed onto this upper end in the longitudinal direction of this fuel assembly casing 3, in such a way that the bearing bodies 20 and 21 are located within the fuel assembly casing 3 and the walls 10 and 11, together with the elongate L-shaped profile 13, are located outside the fuel assembly casing 3. The angled part 7 then has to be displaced in the direction of the diagonal of the square cross section of the fuel assembly casing 3, that is to say laterally onto this fuel assembly casing 3, so that finally, essentially the bore 121 in the angled part 7 is in alignment with the bore in the stay bolt 23 on the top side of the fuel assembly head 2 and the screw bolt 22 can be firmly screwed through the bore 121 in a longitudinal bore of this stay bolt 23. The walls 10 and 11 bear snugly against the outside of the fuel assembly casing 3, the bearing bodies 20 and 21 bear snugly against the inside of the fuel assembly casing 3, and the rigid pegs 16 and 17 are fitted laterally in the fuel assembly head 2 into the ports 26 and 27 and into the pockets 30 located under these ports, so that a proper and verifiable holding connection is necessarily made for geometrical reasons between the angled part 7 on one hand, and the fuel assembly casing 3 and the fuel assembly head 2 on the other hand. The operation can be carried out in reverse order when the angled part 7 is removed from the fuel assembly casing 3 again.

Figure 6:
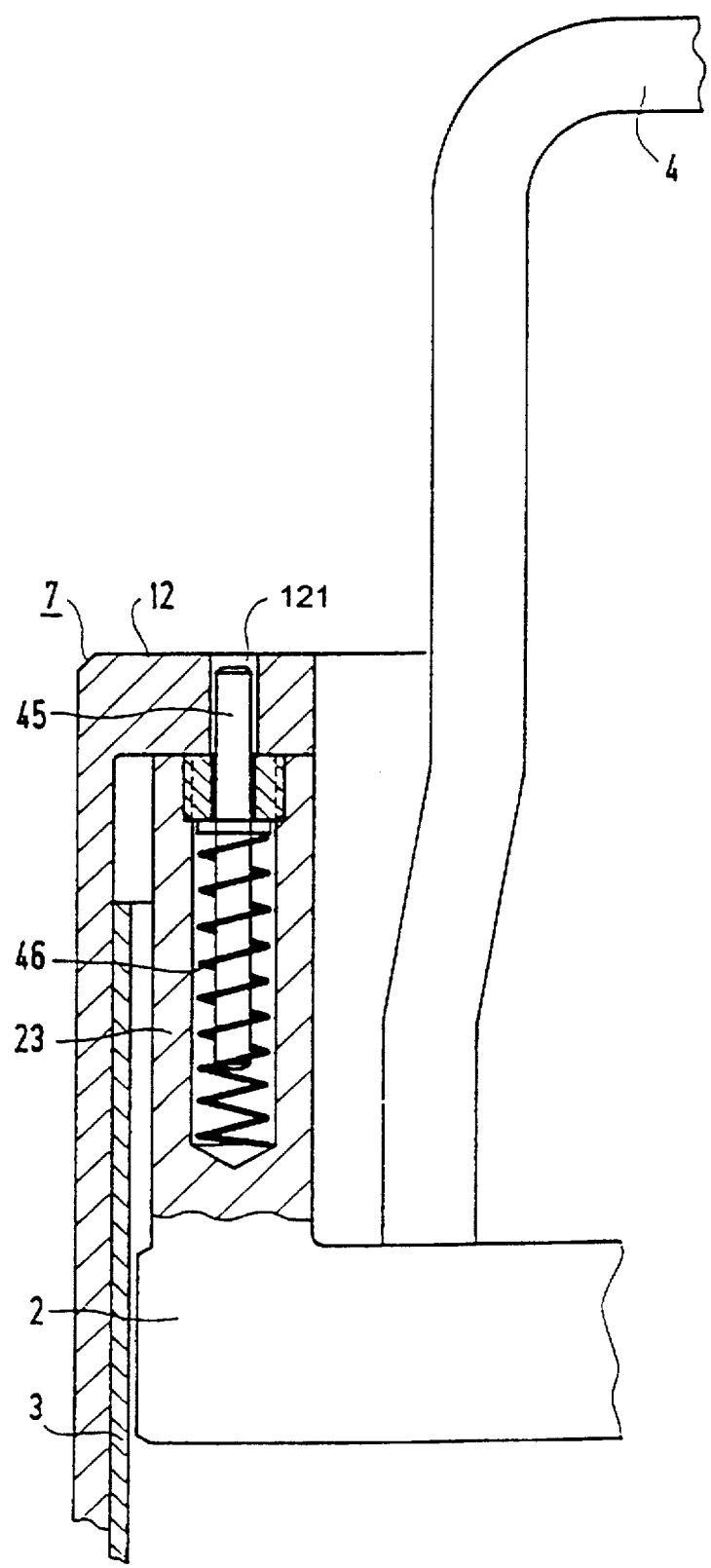
FIG. 6 is an enlarged view similar to FIG. 2 of another embodiment of the nuclear reactor fuel assembly.

As is indicated in FIG. 6, the stay bolt 23 can have a longitudinal bore extending in the longitudinal direction of the fuel assembly casing 3, on the top side of the fuel assembly head 2. A locking bolt 45 is disposed in this longitudinal bore so as to be displaceable into the stay bolt 23 and consequently into the fuel assembly head 2 counter to the effect of a return spring 46.

When the angled part 7 is placed onto the top end of the fuel assembly casing 3, the locking bolt 45 projecting from the longitudinal bore at the top can be countersunk into the stay bolt 23 relative to the angled part 7.

Finally, when the angled part 7 is displaced in the direction of the diagonal of the cross section of the fuel assembly casing 3, the locking bolt 45 locks into the continuous bore 121 in the angled part 7, so that the angled part 7 is retained, free of play, on the fuel assembly casing 3. In order to release the angled part 7 from the fuel assembly casing 3, it is merely necessary for the locking bolt 45 to be pushed through the bore 121 in the angled part 7 into the longitudinal bores in the stay bolt 23 through the use of a tool, so that the angled part 7 can be displaced backward in the direction of the diagonal of the cross section of the fuel assembly casing 3 and finally lifted off from the fuel assembly casing 3.

As is described by way of example in German Published, Non-Prosecuted Patent Application 28 24 265, corresponding to U.S. Pat. No. 4,304,635 and in German Published, Non-Prosecuted Patent Application DE 30 27 562 A1, corresponding to U.S. Pat. No. 4,448,744, in each case four nuclear reactor fuel assemblies according to FIG. 3 are disposed in a square grid mesh of a transverse grid, the so-called upper nuclear grid, in a boiling water nuclear reactor. Each of these four nuclear reactor fuel assemblies is located in a corner of the mesh in such a way that the corners of the fuel assembly casings 3, together with the angled parts 7, are disposed in the center of the mesh and two leaf springs 40 of laterally adjacent nuclear reactor fuel assemblies in each case are supported relative to one another there. The fuel assembly casings 3 of the four nuclear reactor fuel assemblies located in the same mesh of the nuclear grid form a gap-like interspace of cruciform cross section, into which an elongate control rod of likewise cruciform cross section can be pushed from the lower ends of these four nuclear reactor fuel assemblies.

We claim:

1. A nuclear reactor fuel assembly, comprising:

an elongate fuel assembly casing having two open ends and having sides;

a fuel assembly head disposed at one of said open ends;

a fuel assembly foot disposed at the other of said open ends;

a rigid connecting body connected between said fuel assembly head and said fuel assembly foot;

fuel rods disposed between said fuel assembly head and said fuel assembly foot, said fuel rods containing nuclear fuel;

an angled part adapted to said fuel assembly casing and having two legs with a vertex, said angled part bearing from the outside against a first side and a second side of said sides of said fuel assembly casing meeting one another;

a bolt disposed at said vertex of said two legs for retaining said angled part on said fuel assembly head, said angled part further having a bearing body bearing from an inside against at least one of a third side and a fourth side of said sides of said fuel assembly casing;

said angled part and said fuel assembly casing having surfaces disposed at each of said first side and said second side of said fuel assembly casing; and at least one of said surfaces having a peg disposed rigidly thereon and at least one opposite one of said surfaces having an opening formed therein in which said peg engages.

2. The nuclear reactor fuel assembly according to claim 1, wherein said peg is disposed rigidly on said angled part and engages into a port formed by said opening in one of said first side and said second side of said fuel assembly casing.

3. The nuclear reactor fuel assembly according to claim 1, wherein said peg is disposed rigidly on one of said first side and said second side of said fuel assembly casing and engages into a pocket formed by said opening in said angled part.

4. The nuclear reactor fuel assembly according to claim 1, wherein said peg is disposed rigidly on said angled part and engages into a port formed by said opening in one of said first side and said second side of said fuel assembly casing, and another peg is disposed rigidly on one of said first side and said second side of said fuel assembly casing and engages into a pocket formed by said opening in said angled part.

5. The nuclear reactor fuel assembly according to claim 1, including a return spring exerting a force in a given direction against said bolt, said bolt being a locking bolt attached to said fuel assembly head for countersinking into said fuel assembly head in longitudinal direction of said fuel assembly casing counter to said given direction and engaging into a continuous bore in said angled part for displacement in longitudinal direction of said fuel assembly casing.

6. The nuclear reactor fuel assembly according to claim 1, including a port in at least one of said third side and said fourth side of said fuel assembly casing, said bearing body covering said port.

7. The nuclear reactor fuel assembly according to claim 2, wherein said peg on said angled part engaging in one of said first side and said second side of said fuel assembly casing also engages behind said fuel assembly head.

8. The nuclear reactor fuel assembly according to claim 7, wherein said peg engages in a pocket formed in said fuel assembly head.

* * * * *